(12) United States Patent
Shen

(10) Patent No.: US 6,768,623 B1
(45) Date of Patent: Jul. 27, 2004

(54) IC EXCESS CURRENT DETECTION SCHEME

(75) Inventor: Ching-Chang Shen, Los Angeles, CA (US)

(73) Assignee: Texas Instruments Incorporated, Dallas, TX (US)

( * ) Notice: Subject to any disclaimer, the term of this patent is extended or adjusted under 35 U.S.C. 154(b) by 204 days.

(21) Appl. No.: 09/715,694

(22) Filed: Nov. 17, 2000

(51) Int. Cl.[7] .............................................. H02H 3/00
(52) U.S. Cl. .................................... 361/93.9; 361/31
(58) Field of Search .......................... 361/57, 58, 93.1, 361/93.9, 94, 28, 98, 23, 100, 101, 31, 78, 79, 93.2, 86, 87; 327/427, 561, 563; 307/131

(56) References Cited

U.S. PATENT DOCUMENTS

| | | | | |
|---|---|---|---|---|
| 4,553,084 A | * | 11/1985 | Wrathall | 323/316 |
| 5,018,041 A | * | 5/1991 | Szepesi | 361/18 |
| 5,159,516 A | * | 10/1992 | Fujihira | 361/18 |
| 5,637,990 A | * | 6/1997 | Kato et al. | 323/277 |
| 5,977,651 A | * | 11/1999 | Ueda et al. | 307/10.1 |
| 6,011,416 A | * | 1/2000 | Mizuno et al. | 327/108 |
| 6,137,668 A | * | 10/2000 | Feldtkeller | 361/103 |
| 6,351,360 B1 | * | 2/2002 | Kotowski et al. | 361/100 |

* cited by examiner

Primary Examiner—Ronald Leja
(74) Attorney, Agent, or Firm—W. Daniel Swayze, Jr.; W. James Brady; Frederick J. Telecky, Jr.

(57) ABSTRACT

The present invention achieves technical advantages as a circuit (10) detecting excess current on a servo driver IC and preventing the disruptive damage which can be caused by the excess current. Typically, an isolation (Iso) FET 12 is part of the servo driver IC. The detection circuitry (10) has a sensing FET (14) having only a small silicon area whereby the detection circuit (10) is independent of the Iso FET current (Icc) path, being in parallel rather than in series. The detection circuitry also allows production tests on much smaller current thresholds.

13 Claims, 3 Drawing Sheets

IC EXCESS CURRENT DETECTION SCHEME

FIELD OF THE INVENTION

The present invention is generally related to the field of mass storage devices including a hard disk drive (HDD) controllers, and more particularly to detecting excess current on servo driver IC's.

BACKGROUND OF THE INVENTION

Servo driver integrated circuits (IC's) are typically used in mass storage devices including hard disk drive (HDD) control circuits for controlling a spindle motor. Occasionally, excess current conditions to the spindle motor can cause damage to the servo driver, and may also produce excess heat and cause a fire hazard. Conserving die space and minimizing power consumption is a key design criteria for these servo driver IC's.

There is desired an improved servo driver IC capable of detecting excess current of servo drive IC that can facilitate reducing the excess IC current. There is also desired a small protection circuit that can eliminate the excess current condition.

SUMMARY OF THE INVENTION

The present invention achieves technical advantages by detecting excess current on any IC including a servo driver IC and preventing the disruptive damage which can be caused by the excess current. Typically, an isolation (Iso) FET is part of the servo driver IC. A detection circuitry having only a small silicon area is added whereby the detection circuit is independent of the Iso FET current path, being in parallel rather than in series. The detection circuitry also allows production tests on much smaller current thresholds.

DETAILED DESCRIPTION OF THE PREFERRED EMBODIMENT

Figure 1:
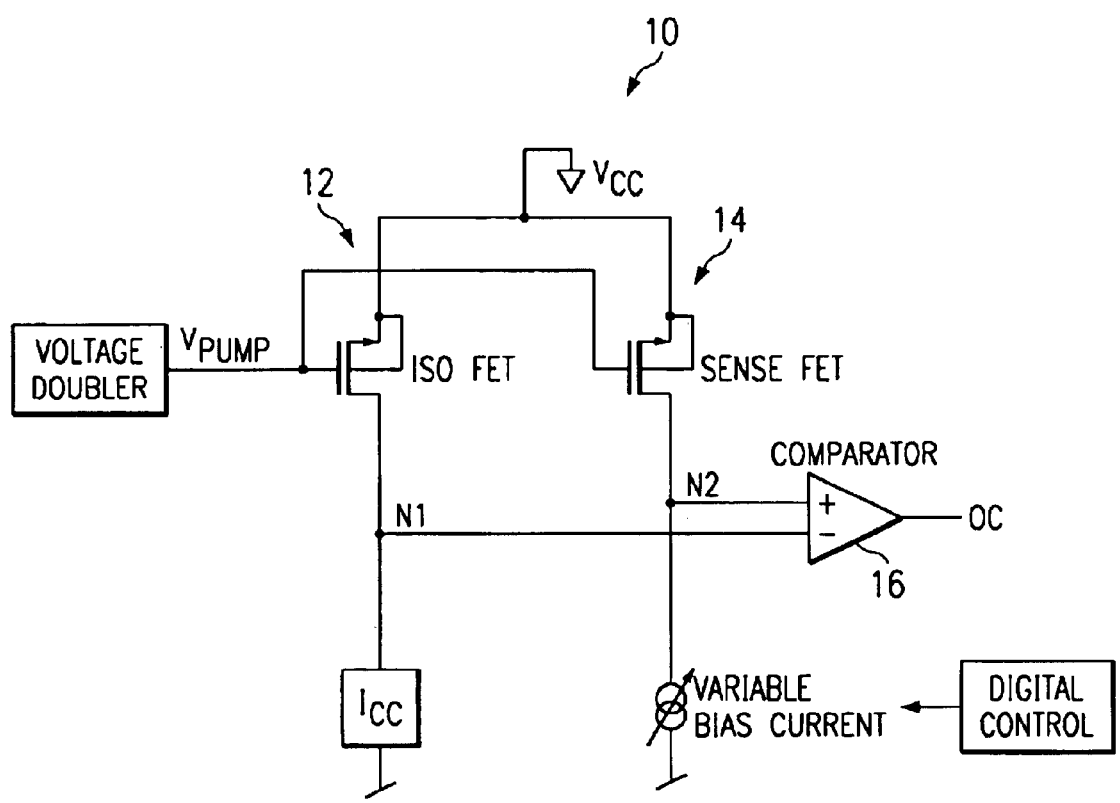
FIG. 1 is a block schematic drawing of the present invention including means for sensing and reducing an overcurrent condition on a HDD controller.
Figure 2A:
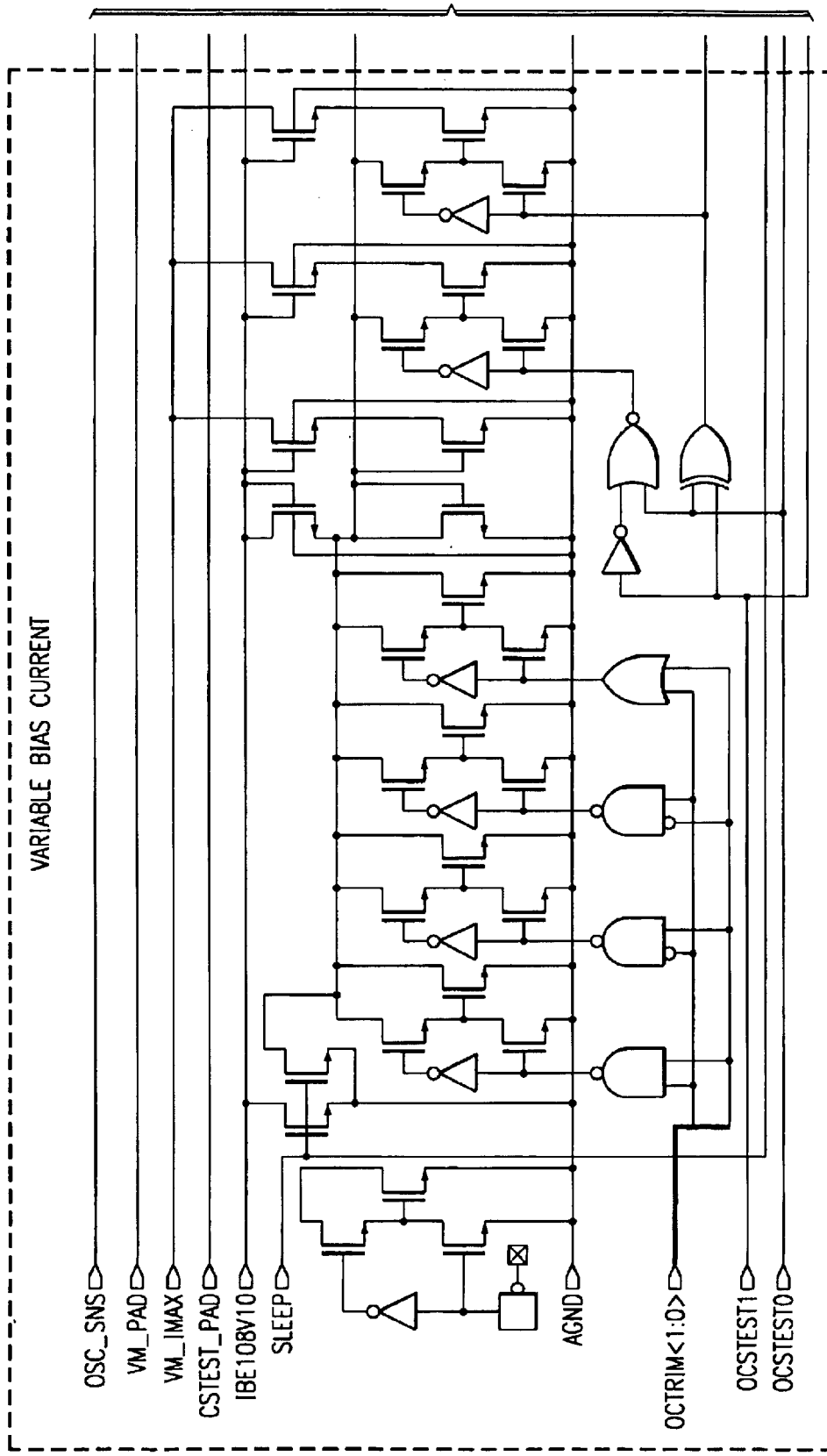
FIGS 2A and 2B are a detailed schematic diagram illustrating one preferred implementation of the invention shown in FIG. 1.
Figure 2B:
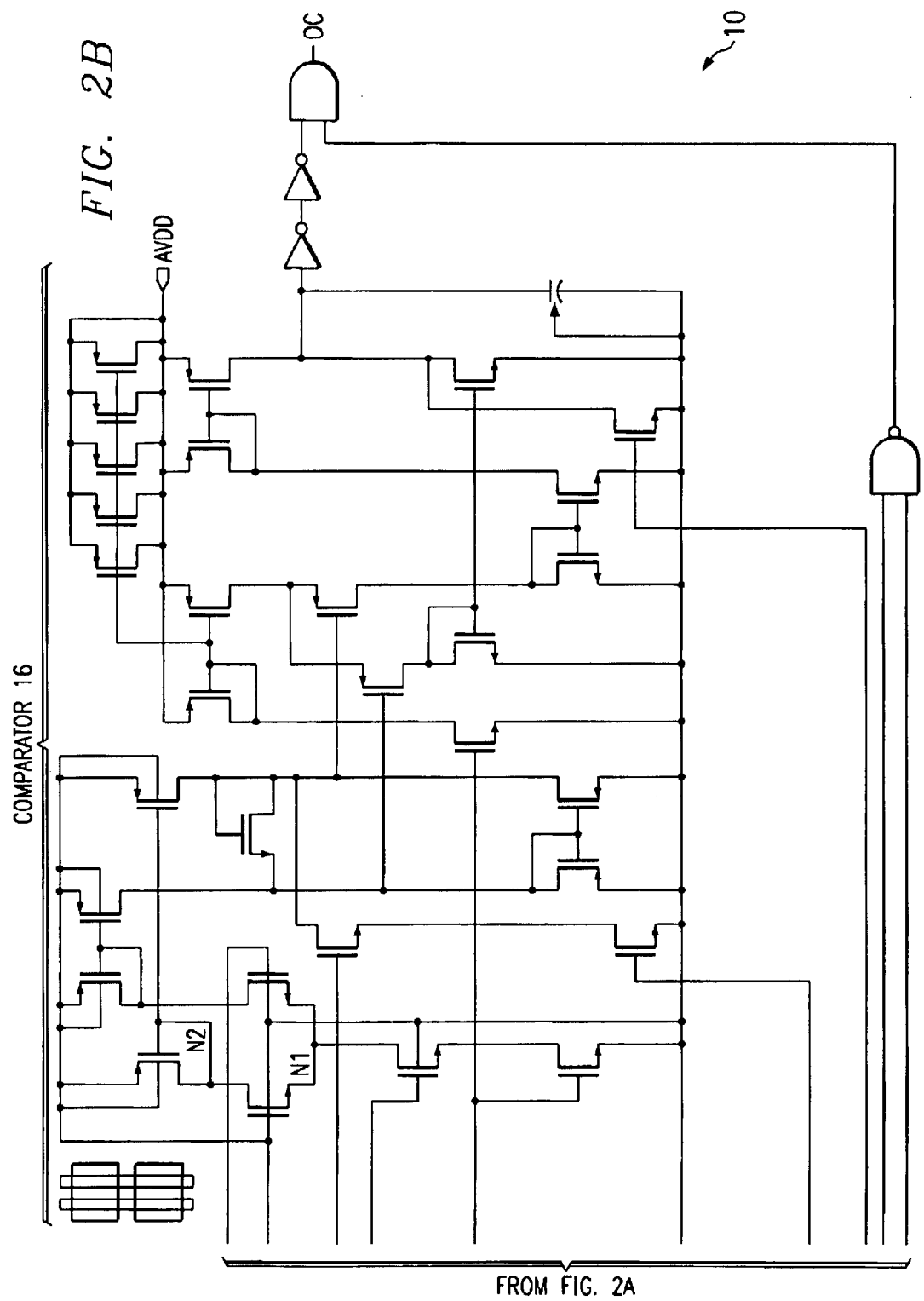

Referring now to FIG. 1, there is shown generally at 10 an overcurrent detection circuit according to the present invention. Current through an isolation FET (Iso FET) 12 is measured and compared with a replica Sense FET 14 at the drains thereof, with the ratio current flowing through the sensing FET 14 setting the detection threshold. Motor current Icc flowing through the Iso FET 12 represents the total supply current from power supply Vcc. Voltage Vpump is the provides a voltage doubler voltage, and the variable Bias Current is digitally programmable through register bits of control circuitry (not shown) to select different detection levels for nominal operation and production tests.

A comparator 16 compares the two drain voltages of the Iso FET 12 and the Sense FET 14, which comparator 16 in turn compares the Icc motor current with the threshold current and responsively generates an overcurrent fault signal OC to invoke further actions by the control circuitry to responsively reduce the Icc current. In the case of a disk drive spindle motor driver IC, the spindle motor will brake for the remaining Pulse Width Modulation (PWM) duty cycle whenever an overcurrent fault occurs upon the assumption that a phase-to-ground short exists.

It's essential to quickly detect excess current on all servo driver IC's and to prevent the disruptive damage which could be caused by the excess current. Typically, the Iso FET 12 is already part of a servo driver IC, and the detection circuitry silicon area added is very small. Also, the detection circuit 10 is independent of the Iso FET 12 current path, and is in parallel rather than in series therewith. Detection circuit 10 also allows production tests on the much smaller current thresholds For reference, node N1 is at the drain of Isolation (Iso) FET 12 and is coupled to the negative input to the comparator, and node N2 is at the drain of sense FET 14 and is coupled to the positive input to the comparator.

Voltage Vpump is the chip supply voltage multiplier, and is usually a voltage doubler as shown. Voltage Vpump is used to pull the gate of Iso FET 12 and Sense FET 14 hard so that the resistance across Iso FET 12 and Sense FET 14 is small. Voltage Vpump is usually readily available on the servo IC.

The Iso FET 12 is an on-chip DMOS transistor used as the passing/isolation FET. With its gate tied to voltage Vpump, the Iso FET 12 operates in the linear region and behaves like a resistor. On-chip Iso FET 12 is commonly required in a servo application.

The Sense FET 14 is a scaled down DMOS transistor matched to the Iso FET 12. It is also operated in the linear region and thus behaves like a resistor, with the resistance being inversely proportional to the ratio of the size between Iso FET 12 and Sense FET 14.

The Variable Bias Current on-chip variable bias current is derived from the on-chip bandgap voltage divided by an external precision resistor, (not shown), and is digitally programmable through a serial port interface. The Variable Bias Current is desirable for production test at a smaller Icc and to calibrate out the comparator 16 offset which contributes a large portion of error of the detection threshold accuracy. Production trimming is also implemented in the Variable Bias Current section to set an accurate detection threshold.

The Comparator 16 compares the two voltages at the drains (nodes N1 and N2) of the Iso FET 12 and the Sense FET 14. The Variable Bias Current along with Sense FET 14 (behaving like a resistor) creates a voltage drop from Vcc to the drain of the Sense FET 14, which is the positive input to the comparator 16, and that voltage drop sets the comparison threshold. Because the two FETs are ratioed, the detection threshold becomes:

((Iso FET size)/(Sense FET size))*(Current set at Variable Bias Current).

When the excess current condition occurs (when Icc becomes larger than the threshold), the drain of Iso FET 12 will be pulled lower than the threshold set at the positive input of the comparator 16, and thus, the comparator 16 output OC will transition from low to high. An OC "HIGH" state indicates the chip draws too much current. A delay in time is advantageously added in the comparator 16 to filter out any transient current spikes through the Iso FET 12. For the servo IC, the idea is to ignore current spikes caused by the spindle driver (not shown in the figure) negative flyback during normal PWM operation, and to detect only a short from the spindle three phases to ground or any other illegal operation that draws excess current.

When an excess current is detected, the comparator 16 output OC transitions from low to high. Subsequent actions must be taken to reduce the current before the chip is damaged, or even worse, excess current generates excess heat and eventually the part could burn and cause a fire hazard. This invention can be part of a UL protection scheme. This circuit may also reduce the spindle current upon an OC fault.

Voltage at drain of Sense FET, node N2:
tip $V_{N2}=V_{CC}-R*I_{VBC}=V_{CC}-k*I_{VBC}/\text{Sense FET size}$ Where k is a constant, and $I_{VBC}$ is the variable bias current.

The Sense FET 14 size is equivalent to the width of the transistor.

Voltage at drain of Iso FET, N1:

$$V_{N1} = V_{CC} - R^1 * I_{CC}$$
$$= V_{CC} - \frac{k*I_{CC}}{Iso\ FET\ size}$$

The threshold of the comparator 16 is when the two input voltages are equal:

$$V_{CC} - \frac{k*I_{CC}}{Iso\ FET\ size} = V_{CC} - \frac{k*I_{VBC}}{Sense\ FET\ size} \text{ or:}$$
$$I_{CC} = \frac{Iso\ FET\ size}{Sense\ FET\ size} * I_{VBC}$$

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A overcurrent protection circuit for a motor drive circuit, comprising:
   a first FET having a gate input and conducting a motor current of the motor, a drain and a source;
   a second FET having a gate input coupled to said first FET input gate and conducting a bias current, a drain and a source; and
   a comparator directly coupled across said drains of said first FET and said second FET and providing an output indicative of a voltage across said comparator inputs to be used for overcurrent protection.

2. The overcurrent protection circuit of claim 1 wherein each said first FET gate and said second FET gate are driven hard by a voltage to generate a low on resistance between the respective source and drain.

3. The overcurrent protection circuit of claim 2 wherein said bias current is variable to responsively adjust a threshold voltage of said comparator.

4. The overcurrent protection circuit of claim 3 wherein said second FET drain is coupled to a non-inverting input of said comparator.

5. The overcurrent protection circuit of claim 4 wherein said first FET drain is coupled to an inverting input of said comparator.

6. The overcurrent protection circuit of claim 2 wherein said FET drive voltage is generated by a voltage pump.

7. The overcurrent protection circuit of claim 6 wherein said voltage pump is a voltage doubler.

8. The overcurrent protection circuit of claim 1 wherein a ratio of said motor current to said bias current is proportional to a size of said first FET with respect to a size of said second FET.

9. The overcurrent protection circuit of claim 1 wherein said bias current is selectively programmable.

10. The overcurrent protection circuit of claim 9 wherein said bias current is digitally programmable.

11. The overcurrent protection circuit of claim 1 wherein said comparator generates said output being indicative of said motor current exceeding a predetermined threshold and being a function of said bias current.

12. The overcurrent protection circuit of claim 1 wherein said comparator has delay circuitry filtering out any transient current spikes through said first FET.

13. The overcurrent protection circuit of claim 1 wherein said first FET is in parallel with said second FET.

* * * * *